United States Patent
Hammad et al.

(10) Patent No.: US 8,636,205 B2
(45) Date of Patent: Jan. 28, 2014

(54) METHOD AND SYSTEM FOR GENERATING A DYNAMIC VERIFICATION VALUE

(71) Applicants: Ayman Hammad, Pleasanton, CA (US); Patrick Faith, Pleasanton, CA (US); Christian Aabye, Morgan Hill, CA (US); Jagdeep Singh Sahota, Rodeo, CA (US)

(72) Inventors: Ayman Hammad, Pleasanton, CA (US); Patrick Faith, Pleasanton, CA (US); Christian Aabye, Morgan Hill, CA (US); Jagdeep Singh Sahota, Rodeo, CA (US)

(73) Assignees: Visa U.S.A. Inc., San Francisco, CA (US); Visa International Service Association, San Francisco, CA (US)

( * ) Notice: Subject to any disclaimer, the term of this patent is extended or adjusted under 35 U.S.C. 154(b) by 0 days.

(21) Appl. No.: 13/763,570

(22) Filed: Feb. 8, 2013

(65) Prior Publication Data

US 2013/0226802 A1   Aug. 29, 2013

Related U.S. Application Data

(63) Continuation of application No. 13/308,419, filed on Nov. 30, 2011, now Pat. No. 8,387,866, which is a continuation of application No. 12/776,949, filed on May 10, 2010, now Pat. No. 8,087,582, which is a continuation of application No. 11/764,376, filed on Jun. 18, 2007, now Pat. No. 7,740,168, which is a continuation-in-part of application No. 10/642,878, filed on Aug. 18, 2003, now Pat. No. 7,761,374.

(60) Provisional application No. 60/815,059, filed on Jun. 19, 2006, provisional application No. 60/815,430, filed on Jun. 20, 2006, provisional application No. 60/884,089, filed on Jan. 9, 2007.

(51) Int. Cl.
*G06Q 40/00* (2012.01)
*G07D 11/00* (2006.01)
*G07F 19/00* (2006.01)

(52) U.S. Cl.
USPC .......................................... 235/379; 235/375

(58) Field of Classification Search
USPC ......... 235/379, 380, 375, 487, 451, 492, 493; 705/41
See application file for complete search history.

(56) References Cited

U.S. PATENT DOCUMENTS

| 3,956,615 A | 5/1976 | Anderson et al. |
| 4,186,871 A | 2/1980 | Anderson et al. |

(Continued)

FOREIGN PATENT DOCUMENTS

| JP | 2000-078128 | 3/2000 |
| JP | 2000-298733 A | 10/2000 |

(Continued)

OTHER PUBLICATIONS

International Search Report from PCT/US04/26813, May 7, 2007.

(Continued)

*Primary Examiner* — Edwyn Labaze
(74) *Attorney, Agent, or Firm* — Kilpatrick Townsend & Stockton LLP (57) ABSTRACT

A method is disclosed. The method includes generating a verification value in response to a transaction involving a portable consumer device, where the verification value is generated using a first dynamic data element and a second dynamic data element. The verification value is sent to a service provider associated with the portable consumer device so that the service provider can verify the transaction.

20 Claims, 7 Drawing Sheets

(56) References Cited

U.S. PATENT DOCUMENTS

| | | |
|---|---|---|
| 4,238,853 A | 12/1980 | Ehrsam et al. |
| 4,277,837 A | 7/1981 | Stuckert |
| 4,317,957 A | 3/1982 | Sendrow |
| 4,423,287 A | 12/1983 | Zeidler |
| 4,528,442 A | 7/1985 | Endo |
| 5,254,843 A | 10/1993 | Hynes et al. |
| 5,311,594 A | 5/1994 | Penzias |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,577,121 A | 11/1996 | Davis et al. |
| 5,615,110 A | 3/1997 | Wong |
| 5,625,689 A | 4/1997 | Indeck et al. |
| 5,627,355 A | 5/1997 | Rahman et al. |
| 5,679,940 A | 10/1997 | Templeton et al. |
| 5,708,422 A | 1/1998 | Blonder et al. |
| 5,721,781 A | 2/1998 | Deo et al. |
| 5,737,421 A | 4/1998 | Audebert |
| 5,740,244 A | 4/1998 | Indeck et al. |
| 5,745,576 A | 4/1998 | Abraham et al. |
| 5,774,525 A | 6/1998 | Kanevsky et al. |
| 5,802,176 A | 9/1998 | Audebert |
| 5,819,226 A | 10/1998 | Gopinathan et al. |
| 5,832,458 A | 11/1998 | Jones |
| 5,834,747 A | 11/1998 | Cooper |
| 5,835,599 A | 11/1998 | Buer |
| 5,839,119 A | 11/1998 | Krsul et al. |
| 5,872,834 A | 2/1999 | Teitelbaum |
| 5,878,337 A | 3/1999 | Joao et al. |
| 5,883,810 A | 3/1999 | Franklin |
| 5,903,830 A | 5/1999 | Joao et al. |
| 5,914,471 A | 6/1999 | Van De Pavert |
| 5,914,472 A | 6/1999 | Foladare et al. |
| 5,920,628 A | 7/1999 | Indeck et al. |
| 5,956,699 A | 9/1999 | Wong et al. |
| 5,988,497 A | 11/1999 | Wallace |
| 6,005,942 A | 12/1999 | Chan et al. |
| 6,012,144 A | 1/2000 | Pickett |
| 6,016,476 A | 1/2000 | Maes et al. |
| 6,029,154 A | 2/2000 | Pettitt |
| 6,055,505 A | 4/2000 | Elston |
| 6,064,990 A | 5/2000 | Goldsmith |
| 6,081,792 A | 6/2000 | Cucinotta et al. |
| 6,095,413 A | 8/2000 | Tetro et al. |
| 6,112,191 A | 8/2000 | Burke |
| 6,122,624 A | 9/2000 | Tetro et al. |
| 6,157,707 A | 12/2000 | Baulier et al. |
| 6,219,793 B1 | 4/2001 | Li et al. |
| 6,234,901 B1 | 5/2001 | Nagoshi et al. |
| 6,260,146 B1 | 7/2001 | Mos et al. |
| 6,263,447 B1 | 7/2001 | French et al. |
| 6,282,656 B1 | 8/2001 | Wang |
| 6,298,336 B1 | 10/2001 | Davis et al. |
| 6,308,890 B1 | 10/2001 | Cooper |
| 6,330,550 B1 | 12/2001 | Brisebois et al. |
| 6,367,011 B1 | 4/2002 | Lee et al. |
| 6,442,532 B1 | 8/2002 | Kawan |
| 6,488,206 B1 | 12/2002 | Flaig et al. |
| 6,496,936 B1 | 12/2002 | French et al. |
| 6,505,046 B1 | 1/2003 | Baker |
| 6,523,745 B1 | 2/2003 | Tamori |
| 6,529,725 B1 | 3/2003 | Joao et al. |
| 6,535,855 B1 | 3/2003 | Cahill et al. |
| 6,592,044 B1 | 7/2003 | Wong et al. |
| 6,607,136 B1 | 8/2003 | Atsmon et al. |
| 6,612,488 B2 | 9/2003 | Suzuki |
| 6,647,269 B2 | 11/2003 | Hendrey et al. |
| 6,714,918 B2 | 3/2004 | Hillmer et al. |
| 6,715,672 B1 | 4/2004 | Tetro et al. |
| RE38,572 E | 8/2004 | Tetro et al. |
| 6,775,539 B2 | 8/2004 | Deshpande |
| 6,830,183 B2 | 12/2004 | von Mueller et al. |
| 6,832,721 B2 | 12/2004 | Fujii |
| 6,837,425 B2 | 1/2005 | Gauthier et al. |
| 6,839,840 B1 | 1/2005 | Cooreman |
| 6,839,845 B2 | 1/2005 | Hsu et al. |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,899,269 B1 | 5/2005 | Deland |
| 6,904,526 B1 | 6/2005 | Hongwei |
| 6,913,194 B2 | 7/2005 | Suzuki |
| 6,944,782 B2 | 9/2005 | von Mueller et al. |
| 6,948,656 B2 | 9/2005 | Williams |
| 6,968,180 B2 | 11/2005 | Kirby et al. |
| 6,983,882 B2 | 1/2006 | Cassone |
| 7,003,495 B1 | 2/2006 | Burger et al. |
| 7,003,497 B2 | 2/2006 | Maes |
| 7,007,840 B2 | 3/2006 | Davis |
| 7,013,293 B1 | 3/2006 | Kipnis et al. |
| 7,024,396 B2 | 4/2006 | Woodward |
| 7,044,394 B2 | 5/2006 | Brown |
| 7,051,002 B2 | 5/2006 | Keresman, III et al. |
| 7,058,611 B2 | 6/2006 | Kranzley et al. |
| 7,058,978 B2 | 6/2006 | Feuerstein et al. |
| 7,096,003 B2 | 8/2006 | Joao et al. |
| 7,107,250 B2 | 9/2006 | Harrison |
| 7,143,095 B2 | 11/2006 | Barrett et al. |
| 7,152,788 B2 | 12/2006 | Williams |
| 7,225,156 B2 | 5/2007 | Fisher et al. |
| 7,243,853 B1 | 7/2007 | Levy et al. |
| 7,251,624 B1 | 7/2007 | Lee et al. |
| 7,257,545 B1 | 8/2007 | Hung |
| 7,264,154 B2 | 9/2007 | Harris |
| 7,343,317 B2 | 3/2008 | Jokinen et al. |
| 7,349,668 B2 | 3/2008 | Ilan et al. |
| D568,388 S | 5/2008 | Hammad |
| D568,389 S | 5/2008 | Hammad |
| D568,390 S | 5/2008 | Law et al. |
| 7,403,908 B1 | 7/2008 | Jaramillo |
| 7,420,474 B1 | 9/2008 | Elks et al. |
| 7,761,374 B2 | 7/2010 | Sahota et al. |
| 7,899,753 B1 | 3/2011 | Everhart |
| 2001/0037453 A1 | 11/2001 | Mitty et al. |
| 2002/0002681 A1 | 1/2002 | Kawano et al. |
| 2002/0007320 A1 | 1/2002 | Hogan et al. |
| 2002/0032661 A1 | 3/2002 | Schuba et al. |
| 2002/0038287 A1 | 3/2002 | Villaret et al. |
| 2002/0046189 A1 | 4/2002 | Morita et al. |
| 2002/0049818 A1 | 4/2002 | Gihuly et al. |
| 2002/0091562 A1 | 7/2002 | Siegel et al. |
| 2002/0091945 A1 | 7/2002 | Ross |
| 2002/0095388 A1 | 7/2002 | Yu et al. |
| 2002/0095389 A1 | 7/2002 | Gaines |
| 2002/0096570 A1 | 7/2002 | Wong et al. |
| 2002/0099665 A1 | 7/2002 | Burger et al. |
| 2002/0108062 A1 | 8/2002 | Nakajima et al. |
| 2002/0116341 A1 | 8/2002 | Hogan et al. |
| 2002/0123972 A1 | 9/2002 | Hodgson et al. |
| 2002/0133462 A1 | 9/2002 | Shteyn |
| 2002/0147658 A1 | 10/2002 | Kwan |
| 2002/0153424 A1 | 10/2002 | Li |
| 2002/0158747 A1 | 10/2002 | McGregor et al. |
| 2002/0180584 A1 | 12/2002 | McGregor et al. |
| 2002/0194499 A1 | 12/2002 | Audebert et al. |
| 2003/0074317 A1 | 4/2003 | Hofi |
| 2003/0105964 A1 | 6/2003 | Brainard et al. |
| 2003/0115142 A1 | 6/2003 | Brickell et al. |
| 2003/0135463 A1 | 7/2003 | Brown et al. |
| 2003/0169881 A1 | 9/2003 | Niedermeyer |
| 2003/0200184 A1 | 10/2003 | Dominguez et al. |
| 2003/0208684 A1 | 11/2003 | Camacho et al. |
| 2003/0225703 A1 | 12/2003 | Angel |
| 2004/0015435 A1 | 1/2004 | Solomone et al. |
| 2004/0024638 A1 | 2/2004 | Restis |
| 2004/0031856 A1 | 2/2004 | Atsmon et al. |
| 2004/0059688 A1 | 3/2004 | Dominguez et al. |
| 2004/0064403 A1 | 4/2004 | Hasumi et al. |
| 2004/0078340 A1 | 4/2004 | Evans |
| 2004/0107170 A1 | 6/2004 | Labrou et al. |
| 2004/0156537 A1 | 8/2004 | Chung et al. |
| 2004/0171406 A1 | 9/2004 | Purk |

(56) References Cited

U.S. PATENT DOCUMENTS

| | | |
|---|---|---|
| 2004/0185830 A1 | 9/2004 | Joao et al. |
| 2004/0199470 A1 | 10/2004 | Ferry et al. |
| 2005/0043997 A1 | 2/2005 | Sahota et al. |
| 2005/0060233 A1 | 3/2005 | Bonalle et al. |
| 2005/0060730 A1 | 3/2005 | Soeda et al. |
| 2005/0065876 A1* | 3/2005 | Kumar .................. 705/39 |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080730 A1 | 4/2005 | Sorrentino |
| 2005/0091152 A1 | 4/2005 | Suisa |
| 2005/0097320 A1 | 5/2005 | Golan et al. |
| 2005/0119978 A1 | 6/2005 | Ates |
| 2005/0122209 A1 | 6/2005 | Black |
| 2005/0149455 A1 | 7/2005 | Bruesewitz et al. |
| 2005/0170814 A1 | 8/2005 | Joao et al. |
| 2005/0171905 A1 | 8/2005 | Wankmueller et al. |
| 2005/0218229 A1 | 10/2005 | Morley et al. |
| 2005/0228986 A1 | 10/2005 | Fukasawa et al. |
| 2005/0268107 A1 | 12/2005 | Harris et al. |
| 2005/0273442 A1 | 12/2005 | Bennett et al. |
| 2006/0018523 A1 | 1/2006 | Saitoh et al. |
| 2006/0059110 A1 | 3/2006 | Madhok et al. |
| 2006/0136546 A1 | 6/2006 | Trioano et al. |
| 2006/0165060 A1 | 7/2006 | Dua |
| 2006/0202025 A1 | 9/2006 | Calabrese et al. |
| 2006/0219776 A1 | 10/2006 | Finn |
| 2006/0281439 A1 | 12/2006 | Benco et al. |
| 2006/0282382 A1 | 12/2006 | Balasubramanian et al. |
| 2006/0287955 A1 | 12/2006 | Moulart et al. |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0034679 A1 | 2/2007 | Gauthier et al. |
| 2007/0055630 A1 | 3/2007 | Gauthier et al. |
| 2007/0057034 A1 | 3/2007 | Gauthier et al. |
| 2007/0136131 A1 | 6/2007 | Mankoff |
| 2007/0250380 A1 | 10/2007 | Mankoff |
| 2007/0260544 A1 | 11/2007 | Wankmueller et al. |
| 2007/0288641 A1 | 12/2007 | Lee et al. |
| 2007/0294182 A1 | 12/2007 | Hammad |
| 2008/0004121 A1 | 1/2008 | Gatto et al. |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0065553 A1 | 3/2008 | Faith et al. |
| 2008/0103982 A1 | 5/2008 | Hammad et al. |
| 2008/0116264 A1 | 5/2008 | Hammad et al. |
| 2008/0120214 A1 | 5/2008 | Steele et al. |
| 2008/0120236 A1 | 5/2008 | Faith et al. |
| 2008/0128513 A1 | 6/2008 | Hammad et al. |
| 2008/0163257 A1 | 7/2008 | Carlson et al. |
| 2008/0183480 A1 | 7/2008 | Carlson et al. |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0302876 A1 | 12/2008 | Mullen |
| 2008/0303632 A1 | 12/2008 | Hammad |
| 2009/0055892 A1 | 2/2009 | Lu et al. |
| 2009/0055893 A1 | 2/2009 | Manessis et al. |
| 2009/0171682 A1 | 7/2009 | Dixon et al. |
| 2009/0202081 A1 | 8/2009 | Hammad et al. |
| 2010/0262546 A1 | 10/2010 | Sahota et al. |
| 2011/0231315 A1* | 9/2011 | Bandyopadhyay et al. .... 705/44 |

FOREIGN PATENT DOCUMENTS

| | | |
|---|---|---|
| JP | 2007-517272 A | 6/2007 |
| WO | 00/25262 A1 | 5/2000 |
| WO | 03/081832 A2 | 10/2003 |
| WO | 2005/001635 A2 | 1/2005 |

OTHER PUBLICATIONS

Written Opinion of the International Searching Authority from PCT/US04/26813, May 7, 2007.

International Preliminary Report on Patentability from PCT/US04/26813, May 30, 2007.

Japanese Office Action from JP 2006-524010 dated Sep. 7, 2010 (English translation only).

Decision to Grant from JP 2006-524010 dated Mar. 29, 2011 (English translation only).

Office Action dated Jan. 11, 2008 from U.S. Appl. No. 10/642,878 (9 pages).

Office Action dated Oct. 3, 2008 from U.S. Appl. No. 10/642,878 (9 pages).

Office Action dated Jun. 10, 2009 from U.S. Appl. No. 10/642,878 (6 pages).

Applicant response dated May 12, 2008 to Office Action from U.S. Appl. No. 10/642,878 dated Jan. 11, 2008 (7 pages).

Applicant response dated Mar. 24, 2009 to Office Action from U.S. Appl. No. 10/642,878 dated Oct. 3, 2008 15 pages).

Fujitsu Microelectronics America Announces New Fingerprint Identification Technology for Cell Phones, Mobile Devices Mar. 11, 2002 by Fujitsu Microelectronics America, Inc at www.fujitsu.com/us/news/pr/fma_20020311.html.

* cited by examiner

METHOD AND SYSTEM FOR GENERATING A DYNAMIC VERIFICATION VALUE

CROSS-REFERENCES TO RELATED APPLICATIONS

This application is a continuation application of U.S. patent application Ser. No. 13/308,419, filed Nov. 30, 2011, which is a continuation application of U.S. patent application Ser. No. 12/776,949, filed May 10, 2010, which is a continuation application of U.S. patent application Ser. No. 11/764,376, filed Jun. 18, 2007, which is a non-provisional of and claims priority to U.S. Provisional Patent Application Nos. 60/815,059, filed Jun. 19, 2006, 60/815,430, filed Jun. 20, 2006, and 60/884,089, filed Jan. 9, 2007, the Ser. No. 11/764,376 application also being a continuation-in-part application of U.S. patent application Ser. No. 10/642,878, filed Aug. 18, 2003. All of the above applications are herein incorporated by reference in their entireties for all purposes.

BACKGROUND

As methods and devices for engaging in financial transactions have increased, old problems such as fraud and counterfeiting persist.

One of the primary sources of fraud, which is prevalent in the credit card industry is skimming. Skimming refers to the electronic copying of a card's magnetic stripe data to create counterfeit cards.

Skimming is predominantly a phenomenon afflicting magnetic stripe based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it. In fact, in a wireless environment the opportunity to skim magnetic stripe data is more prevalent. In a wireless environment, a potential skimmer need not physically possess the card to be skimmed nor have access to any of the physical equipment (e.g. POS terminal, communication lines, etc.) which is required for skimming in a wire based environment. A skimmer can, without the knowledge of the consumer or merchant, intercept the wireless transaction and copy the data being transmitted from the card to POS terminal.

To address the above problems, a dCVV or a dynamic card verification value can be used. The dCVV can be generated using an algorithm which uses at least a counter and input data such as an account number, expiration date, and other information. The counter can increase by one each time a transaction is conducted. The dCVV can be independently generated by either a portable consumer device or POS terminal at the front end of a transaction and can be sent to a back end computer. The counter may be sent from the merchant to the back end computer so that it knows the current counter value associated with the portable consumer device. In other cases, the counter may simply be present at the back end computer. In the latter case, the counter increments every time the back end computer sees a transaction. The back end computer, using a similar algorithm to the one that generated the dCVV at the front end, the counter value, and input data, can independently generate a second dCVV. If the received dCVV and the generated dCVV match, the transaction can be considered authentic. If the dCVVs do not match, this may indicate that the transaction is fraudulent.

Some dCVVs, however, typically only include one dynamic data element to generate the dCVV. The dynamic data element may be counter. If the counter and other data elements that are used to create the dynamic CVV are intercepted, the dynamic CVV could be used by an unauthorized person.

Embodiments of the invention address the above problems, and other problems, individually and collectively.

BRIEF SUMMARY

Embodiments of the invention are directed to methods and systems for generating verification values.

One embodiment of the invention is directed to a method comprising: generating a verification value in response to a transaction involving a portable consumer device, wherein the verification value is generated using a first dynamic data element and a second dynamic data element; and sending the verification value to a service provider so that the service provider can verify the verification value. The service provider can be, for example, a payment processing organization or an issuer of the portable consumer device.

Another embodiment of the invention is directed to a computer readable medium comprising: code for generating a verification value in response to a transaction involving a portable consumer device, wherein the verification value is generated using a first dynamic data element and a second dynamic data element; and code for sending the verification value with data in a magnetic stripe data format to a service provider so that the service provider can verify the transaction. The service provider can be, for example, a payment processing organization or an issuer of the portable consumer device.

Another embodiment of the invention is directed to a method comprising: receiving a verification value with data in a magnetic stripe data format in response to a transaction involving a portable consumer device, wherein the verification value is generated using a first dynamic data element and a second dynamic data element; and determining if the received verification value matches a verification value at a service provider computer.

These and other embodiments of the invention are described in further detail below.

DETAILED DESCRIPTION

Generally, embodiments of the present invention provide for methods and systems for dynamically generating a card verification value for each transaction and for utilizing such value to verify that the payment service is authentic and has not been skimmed. The dynamically generated Card Verification Value (referred to herein as the "dCVV") is generated on the portable consumer device, embedded into the payment data, and transmitted to a point of sale terminal. In an alternate embodiment, payment data is received from a portable consumer device, a verification value is generated by a point of sale terminal, and the verification value is embedded into the payment data. The dCVV may be generated using at least two different dynamic data elements such as a counter and a time of day.

In another embodiment, data received by the point of sale terminal is interpreted as simply payment data (e.g. standard magnetic stripe Track 1 and/or Track 2 data without an embedded dCVV) by the point of sale terminal. The point of sale terminal passes on the received data in a magnetic stripe data format to a payment network which, in turn, passes the data on to the service provider in the magnetic stripe data format. As used herein, "magnetic stripe data format" may include a data format that is compatible with conventional magnetic stripe payment card system. Thus, although contactless cards and the like do not have a magnetic stripe, they may still provide data that can eventually be put into a magnetic stripe data format. If the service provider determines that the transaction is one for which a dCVV is required, the service provider independently generates a verification value. If the verification value generated by the service provider does not match the dCVV received from the portable consumer device, the transaction is identified as potentially fraudulent and disapproved.

In an alternate embodiment, data is received by the point of sale terminal and is used by the point of sale terminal to generate a verification value. The point of sale terminal passes on the received data to a payment network which, in turn, passes the data on to the service provider. The service provider independently generates a verification value. If the verification value generated by the service provider computer does not match the dCVV received from the point of sale terminal, the transaction is identified as potentially fraudulent and disapproved.

The service provider computer may comprise a processor, and a computer readable medium comprising instructions executable by the processor. The computer readable medium may comprise code for generating a verification value in response to a transaction involving a portable consumer device, wherein the verification value is generated using a first data dynamic element and a second dynamic data element, and code for sending the verification value to a service provider associated with the portable consumer device so that the service provider can verify the transaction.

For purposes of this application, the term "portable consumer device" can include any device comprising a microprocessor which may be used in a transaction or data exchange as described herein. Other portable consumer devices need not use a microprocessor. Without limiting the generality of the foregoing, "portable consumer device" can include an integrated circuit card (also commonly known as a smartcard), a memory card, a cellular telephone, a personal digital assistant, a mobile electronic device, or a computer.

For purposes of this application, "contactless" or "wireless" can include any communications method or protocol, including proprietary protocols, in which data is exchanged between two devices without the need for the devices to be physically coupled. Without limiting the generality of the foregoing, "contactless" or "wireless" can include data transmissions by laser, radio frequency, infrared communications, Bluetooth, or wireless local area network.

For purposes of this application, the term "payment service" can include any application deployed on a portable consumer device which causes the exchange of data between the portable consumer device and any other device or location. It should be appreciated that "payment service" is not limited to financial applications.

For purposes of this application, "payment data" can include, with respect to financial applications those data elements used by the payment service to execute a transaction, and with respect to non-financial transactions any necessary data elements exclusive of the present invention. For example, when the payment service is a magnetic stripe credit card transaction, "payment data" would comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider. The payment data may reside in a memory located on the portable consumer device.

The portable consumer device can also maintain various dynamic data elements. An example of a dynamic data element is an application transaction counter (ATC). The ATC may initially be set by the service provider to a predetermined value. Thereafter, the ATC may be incremented with each transaction. Alternately, the ATC may be decremented from its initial predetermined value with each transaction. The ATC may be a value of any length. In addition, the service provider which deployed the payment service may maintain a corresponding ATC portable consumer device accessible to the service provider's computer. As discussed in more detail below, this corresponding ATC is used to identify payment services which may have been skimmed. In an alternate embodiment, a cryptogram, digital signature, or hash value based on transaction data may be used in place of or in conjunction with the ATC portable consumer device.

Examples of other dynamic data elements may include a time of day, a current transaction amount, a terminal ID, a merchant ID, and a randomly generated number from a terminal, etc. The data elements are dynamic in the sense that they can change with each transaction or nearly each transaction. The dynamic data elements may relate to a consumer's portable consumer device and/or may relate to the consumer generally.

In embodiments of the invention, the dCVV is generated using at least two dynamic data elements. By using at least two (e.g., at least three or four) dynamic data elements to create a dCVV, it is highly unlikely that a skimmer can determine the dCVV. The skimmer cannot simply skim the counter, but would also have to skim various other pieces of dynamic data in order to generate the dCVV.

The at least two dynamic data elements may be used, with or without other static data elements to create a dCVV. Examples of static data elements comprise a telephone number, a SIM card number, an account number, birthday, home address, expiration date, etc. Static data elements include those that typically do not change from transaction to transaction. For example, an account number associated with a portable consumer device generally does not change from transaction to transaction.

Figure 1:
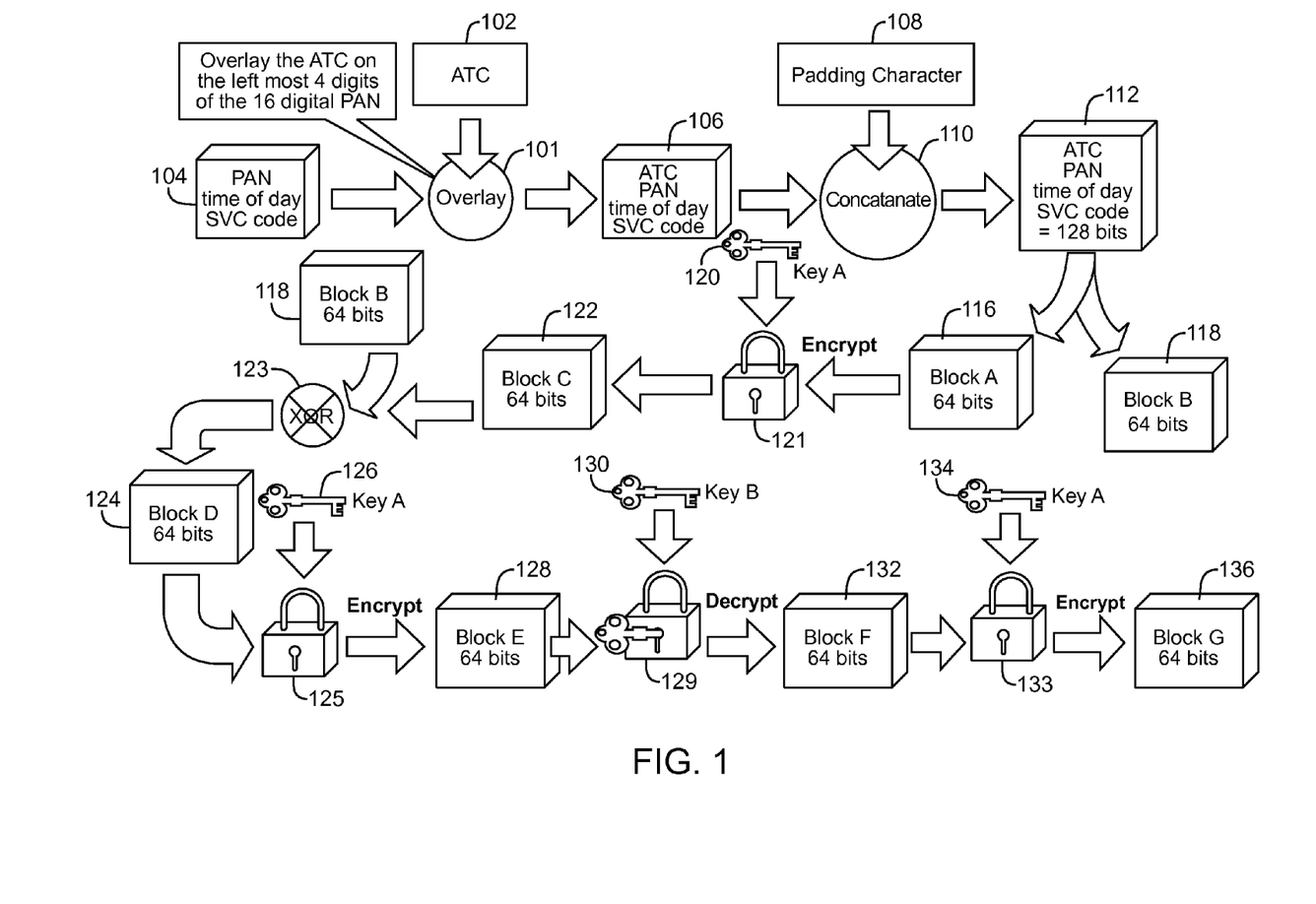
FIG. 1 depicts the method of creating an encrypted data block for use in the present invention.

Each time the payment service is initiated, a dCVV is generated on the portable consumer device for authentication purposes. FIG. 1 depicts the method of generating a dCVV for each transaction according an embodiment the present invention. Initially, a numeric string of predetermined length is created. This numeric string is created by overlaying 101 a first dynamic data element such as an ATC 102 over the corresponding leftmost digits of the account number for the payment service or PAN 104. This numeric string is concatenated on the right with a second dynamic data element such as the time of day and a static data element such as the service code to produce a concatenated value 106. If necessary, padding characters 108 are concatenated 110 on the right of the concatenated value 106 to form a numeric string 112 with a predetermined fixed length. In one embodiment, this numeric string 112 is 128-bits in length, although a numeric string of any length may be used. The padding characters 108 may consist of a stream of 0's, 1's, or any other numeric value that is known both to the portable consumer device and the service provider. The numeric string 112 is bisected into two blocks of equal length, Block A 116 and Block B 118. Block A 116 is then encrypted 121 with a first encryption key 120. The result of the encryption step 121 is Block C 122 of length equal to Block A 116. Block C 122 is then exclusively OR'ed (XOR) 123 with Block B 118 resulting in Block D 124. Block D 124 is then encrypted 125 with a second encryption key 126 to produce Block E 128. Block E 128 is then decrypted 129 using a decryption key 130 to produce Block F 132. Block F 132 is then encrypted 133 using a fourth encryption key 134 to produce Block G 136.

It is apparent to one of ordinary still in the art that the first encryption key 120, the second encryption key 126, the third encryption key 130 and the fourth encryption key 134 may take any preselected value. In one embodiment of the present invention, the first encryption key 120, the second encryption key 126, and the fourth encryption key 134 are equivalent and of a different value from the third encryption key 130. Other permutations of the encryption key values utilized in the methodology of FIG. 1 are within the scope of the present invention.

Figure 2:
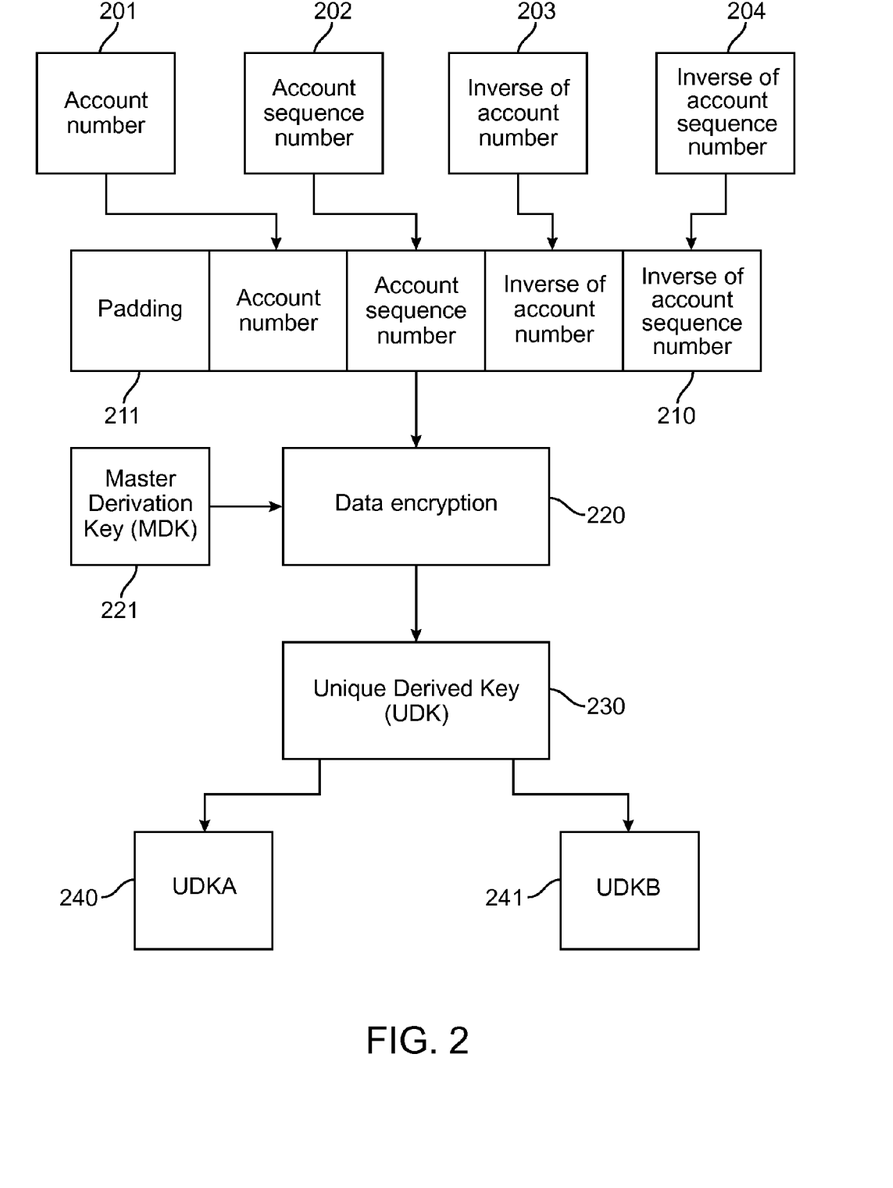
FIG. 2 depicts a method for generating unique derived keys from data residing on a portable consumer device.

In one embodiment, the first encryption key 120, the second encryption key 126, the third encryption key 130, and the fourth encryption key 134 take the value of unique keys derived from data existing on the portable consumer device. Upon deployment, each payment service is personalized by the service provider with a master derivation key. The master derived key may be deployed with payment services in batches (i.e. multiple payment services receive the same master derived key) or individually. Each portable consumer device can be personalized with the functionality to derive keys unique to the payment service. FIG. 2 shows the methodology for deriving two unique keys which are utilized in the preferred embodiment. The account number 201, the account sequence number 202, the inverse of the account number 203, and the inverse of the account sequence number 204 are concatenated together to create a concatenated value 210. If necessary, the concatenated value 210 may be padded with zeroes, or some other value 211, to create a string of a predetermined fixed length. In one embodiment, the concatenated value 210 may be 128 bits in length, although the concatenated value is not limited to being this length. The concatenated value 210 is then encrypted 220 using the master derivation key 221 as the encryption key for each encryption stage. The encryption utilized may include any type of encryption methodology. For example, this encryption step may utilize Triple-DES encryption. The value resulting from the encryption step 220 is a unique derived key or UDK 230 for the application identified by the account number. Two additional keys, UDKA 240 and UDKB 241, are derived from the UDK. The derivation of UDKA 240 and UDKB 241 from the UDK 230 may take any form, including assigning the value of the leftmost half of the UDK 230 to UDKA 240, and assigning the value of the rightmost half of the UDK 230 to UDKB 241. Alternatively, the UDKA 240 may be derived by selecting alternating or other predetermined bit sequences from the UDK 230 while the remaining bits are assigned to UDKB 241. Furthermore, there is no requirement that UDKA 240 and UDKB 241 are of equal length.

Figure 3:
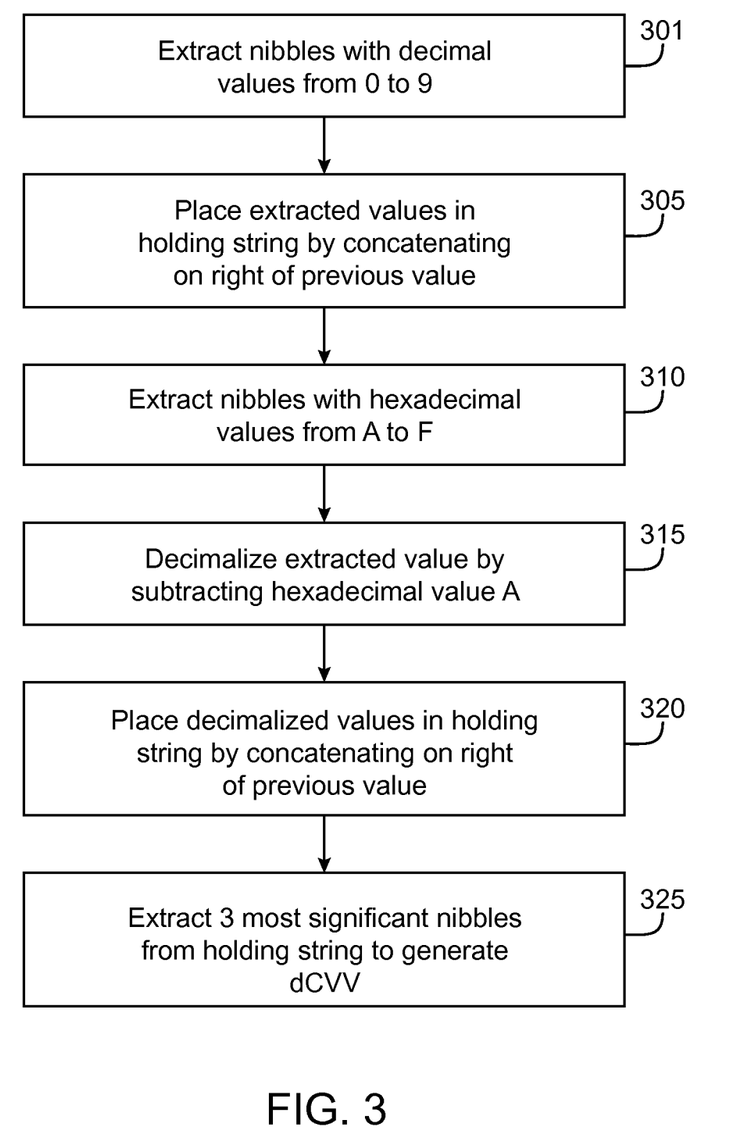
FIG. 3 depicts a method for extracting portions of an encrypted data block for creating a dynamic card verification value according to the present invention.

Returning now to the result of the methodology set forth in FIG. 1. FIG. 3 describes the further processing required to generate the dCVV. Each nibble (4-bit grouping) of the value stored in Block G 136 is subjected to two separate iterative processes to evaluate the value of each nibble. As shown in FIG. 3, beginning with the most significant (i.e. left most) digit of Block G 136 and examining each sequential nibble, if a nibble contains a value ranging from zero to nine, inclusive, that value is extracted 301 and placed in a new numeric string 305, referred to herein as a holding string, by concatenating the extracted value to the right of the previously extracted value, if any. The result may be that the holding string contains a series of values ranging from zero to nine, inclusive, which appear from left to right in the holding string in the same sequence in which they appear in Block G 136.

A second evaluation is then performed again beginning with the most significant digit of Block G 136 and examining each sequential nibble. If a nibble contains a hexadecimal value ranging from ten (A) to fifteen (F), inclusive, that value is extracted 310. The extracted value is then decimalized by subtracting the hexadecimal value A from the extracted value resulting in a decimalized value ranging from zero to five 315. This decimalized value is then concatenated on the right to the right most value of the holding string 320.

Once all nibbles in Block G have been twice examined as described, the three most-significant (i.e. left-most) nibbles of the holding string are extracted 325. This 3-digit value is the dCVV for the transaction. Other numbers of bits may be extracted from the twice-examined nibble string to generate the dCVV for a transaction. Furthermore, different nibbles, such as the rightmost nibbles, may be used as the dCVV for a transaction. The three leftmost nibbles, however, represent a preferred embodiment.

Once generated, the dCVV is embedded into the payment data transmitted from the portable consumer device to the point of sale terminal. The data received by the point of sale terminal may appear to the point of sale terminal as standard payment data. In other words, the point of sale terminal may not be able to determine if a dCVV is embedded and where such dCVV may be located. There is no indication to the point of sale terminal that a dCVV is embedded into the data received from the portable consumer device.

Figure 4:
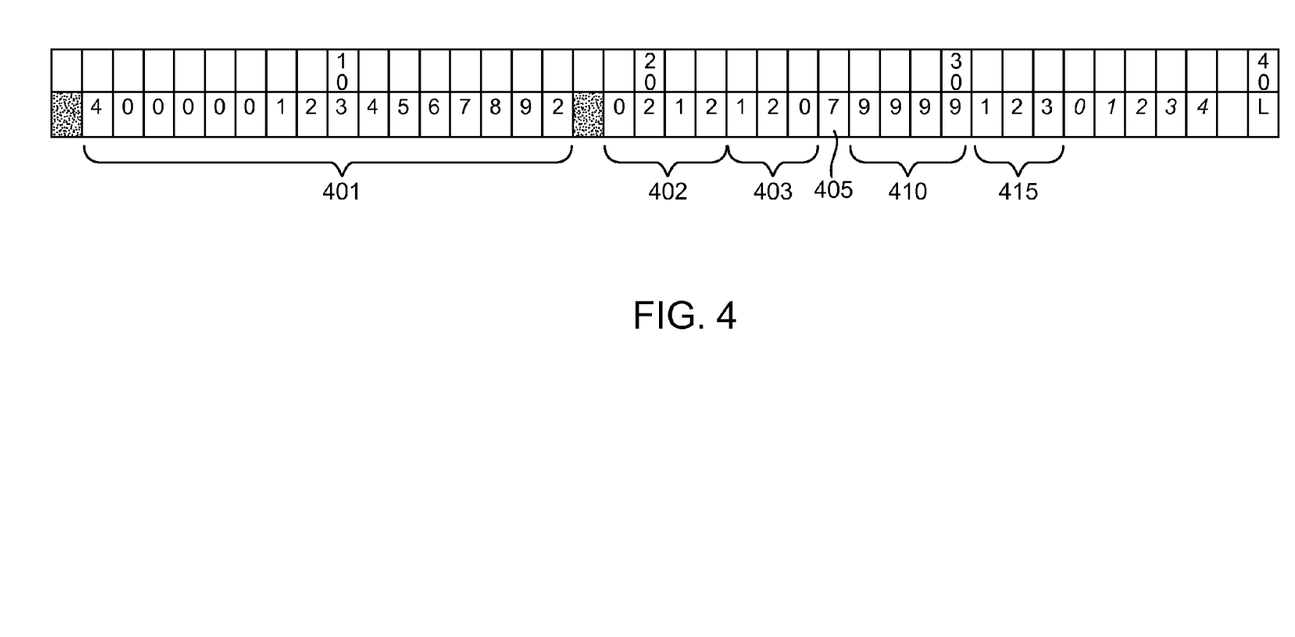
FIG. 4 depicts an exemplary record format for use in an embodiment of the present invention.

FIG. 4 depicts an exemplary record format for transmitting payment data, with the dCVV embedded therein, from the portable consumer device to the point of sale terminal. The record format of FIG. 4 is created by concatenating a primary account number 401 for the payment service, with a time of day 402, and a service code 403. In one embodiment, the primary account number 401 is 16 digits long, the time of day 402 (e.g., 12:00) is four digits long, and the service code 403 is three digits long. However, the primary account number 401, the time of day 402, and the service code 403 are not limited to being these lengths. Next, in a field typically reserved for other uses, a value is placed as an indicator 705 that a dCVV has been embedded in this record. The value of this indicator is known by the service provider which deployed the application on the portable consumer device. Next, the ATC 410 is placed in the field which may typically be reserved for PIN verification data. Finally, the dCVV 415 is concatenated on the right of the record. The remainder of the record may comprise additional discretionary data. Another data field (not shown) may be provided for a static data element such as an expiration date associated with the portable consumer device.

Figure 5:
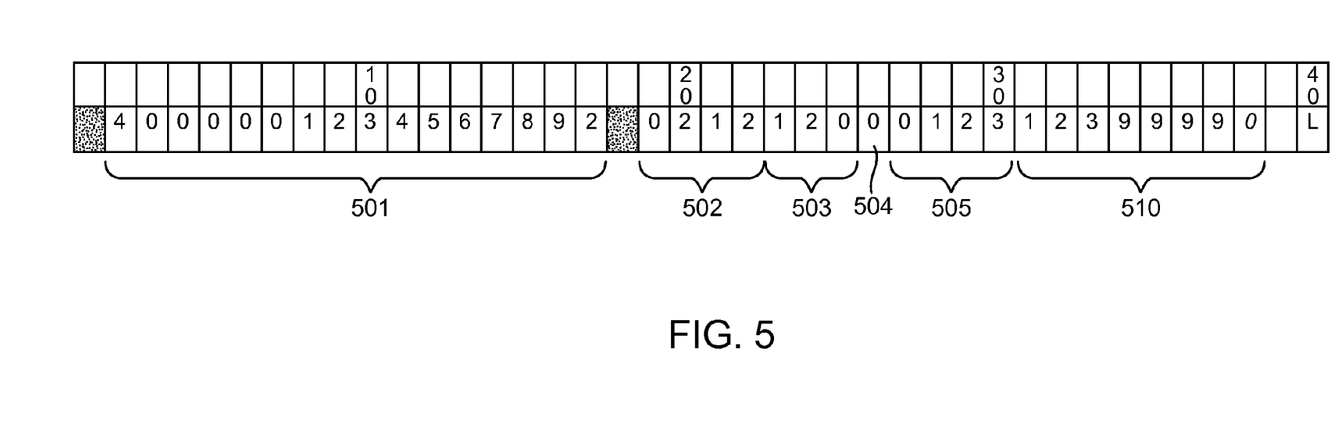
FIG. 5 depicts an alternative exemplary format for use in an embodiment of the present invention.

Alternately, FIG. 5 depicts a second exemplary format for transmitting payment information with the dCVV embedded thereon from the portable consumer device to the point of sale terminal. The format in FIG. 5 is created by concatenating a primary account number 501 for the payment service, with a time of day 502, a service code 503, a PVKI 504, and a field for PIN verification data 505. In one embodiment, the primary account number 501 is sixteen digits long, the time of day 502 is four digits long, the service code 503 is three digits long, the PVKI 504 is one digit long, and the PIN verification data 505 is four digits long. However, the primary account number 501, the time of day 502, the service code 503, the PVKI 504, and the PIN verification data 505 are not limited to being these lengths. Next, in a single data field 510 each of the dynamically created CVV, the ATC and the indicator to be used by the service provider to identify that a dynamic CVV has been embedded are stored in sequence. The remainder of the record may comprise additional discretionary data. The additional discretionary data may comprise other dynamic or static data elements that are used by the service provider computer to independently generate a dCVV. Such data could alternatively reside in a data field such as Field 55. Another data field (not shown) may be provided for a static data element such as an expiration date associated with the portable consumer device.

Figure 6:
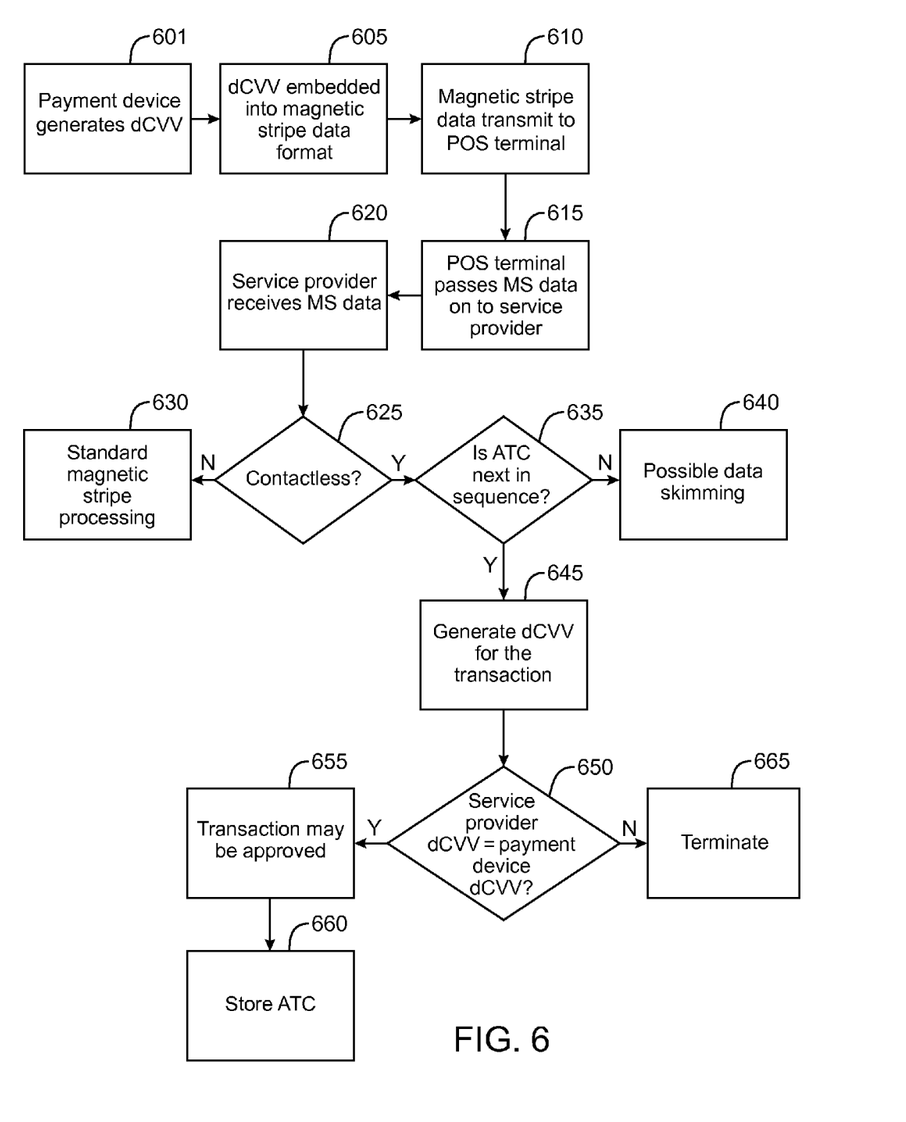
FIG. 6 is a flowchart of a preferred method of utilizing a dynamically created verification value to authenticate a transaction.

An aspect of the present invention is that the system of utilizing the dynamically created CVV allows the service provider to make a determination of the authenticity of the payment service being utilized. This authentication step is not left to merchants, individual point of sale terminals, or other third parties or devices. FIG. 6 shows how the dCVV is used in a contactless environment to permit the service provider to evaluate the authenticity of the payment application deployed on the portable consumer device to make a determination of whether the payment application has been skimmed. Although shown in the embodiment of a contactless environment in FIG. 6, the present invention is not limited to such an environment and may be used for any transaction where magnetic stripe Track 1 and/or Track 2 data is exchanged using any method or means for communicating such data. As shown in FIG. 6, the portable consumer device generates the dCVV 601, preferably using the methodology described above. The dCVV is embedded into the payment data 605.

The payment data may also comprise at least the first and/or second dynamic data elements. Preferably, any dynamic data elements that are sent up to the service provider computer are sent in different data fields, at different times, and/or along different communication paths to the service provider computer. This would make it difficult for a skimmer to determine which dynamic data elements are used to generate the dCVV and where they are located.

In this respect, the exemplary record formats shown in FIG. 4 or FIG. 5 may be utilized. The payment data with the embedded dCVV is transmitted by data communication to the point of sale terminal 610. The point of sale terminal recognizes the received data as in the standard format of payment data and passes the data stream on to the service provider computer 615, likely via a payment network (not shown). The service provider computer receives 620 the payment data with the embedded dCVV and interrogates the appropriate indicator to determine if the transaction was a contactless transaction or not 625. If the service provider computer determines that the transaction was not a contactless transaction, the transaction is processed in its normal manner 630. If the service provider computer determines that the transaction was contactless, the service provider computer compares the ATC received from the portable consumer device to the corresponding ATC stored on the service provider computer to determine if the received ATC is the expected next ATC 635. If the ATC received from the portable consumer device is not the expected next ATC, the payment service deployed on the portable consumer device has potentially been skimmed 640. The computer may also determine if the second dynamic data element matches the second dynamic data element at the service provider computer. For example, the second dynamic data element may be a time of day, and the service provider computer can determine if the time of day that it has matches the time of day that is received from the POS terminal.

In some instances, a dynamic data element such as a counter (or other type of data element that can change) can be received at a back end computer along with a dCVV generated by a portable consumer device. The back end computer can determine if the counter is within a predetermined range. If it is, then the back end computer can independently generate another dCVV. If the received dCVV and the generated dCVV match, then the transaction can be considered authentic. As explained in co-pending U.S. patent application Ser. No. 11/764,370, entitled "Verification Error Reduction System", filed Jun. 18, 2007, which is incorporated herein by reference, allowing the counter to fall within a range can decrease the number of declined transactions. Thus, in some embodiments of the invention, the first dynamic data element (e.g., a counter) can fall within a first range (e.g., between 5-10) and a second dynamic data element (time of day) may fall within a second range (e.g., between 12:00 and 12:05). If one or both of the dynamic data elements are within their predetermined ranges, than the authorization process may continue. If not, then the transaction may be declined and/or more information may be requested from the consumer for authentication purposes.

If the expected next ATC (and/or the expected next second dynamic data element) is received, the service provider computer can independently re-generate the dCVV for the given transaction 645 utilizing a similar or analogous process as described above. If the service provider generated dCVV matches the dCVV received from the portable consumer device 650, the service provider deems the payment application to be authentic 655. The service provider computer then replaces the ATC which was previously stored on the service provider computer with the ATC received from the portable consumer device 660 for subsequent authentications. If the service provider generated dCVV does not match the dCVV received from the portable consumer device, the transaction is potentially fraudulent and is terminated 665.

The methodology of FIG. 6 discussed in conjunction with contactless transactions, is not limited thereto. For example, the methodology may be utilized with respect to transactions above a certain threshold value. In such an instance, the service provider, upon deploying the application, would configure the application to generate a dCVV for transactions above the threshold. The indicator interrogated in Step 625 would then be set for transactions above the threshold value. Similarly, the methodology may be utilized with respect to any other transaction criteria including, but not limited to, geographic location, use patterns, or any other criteria.

Figure 7:
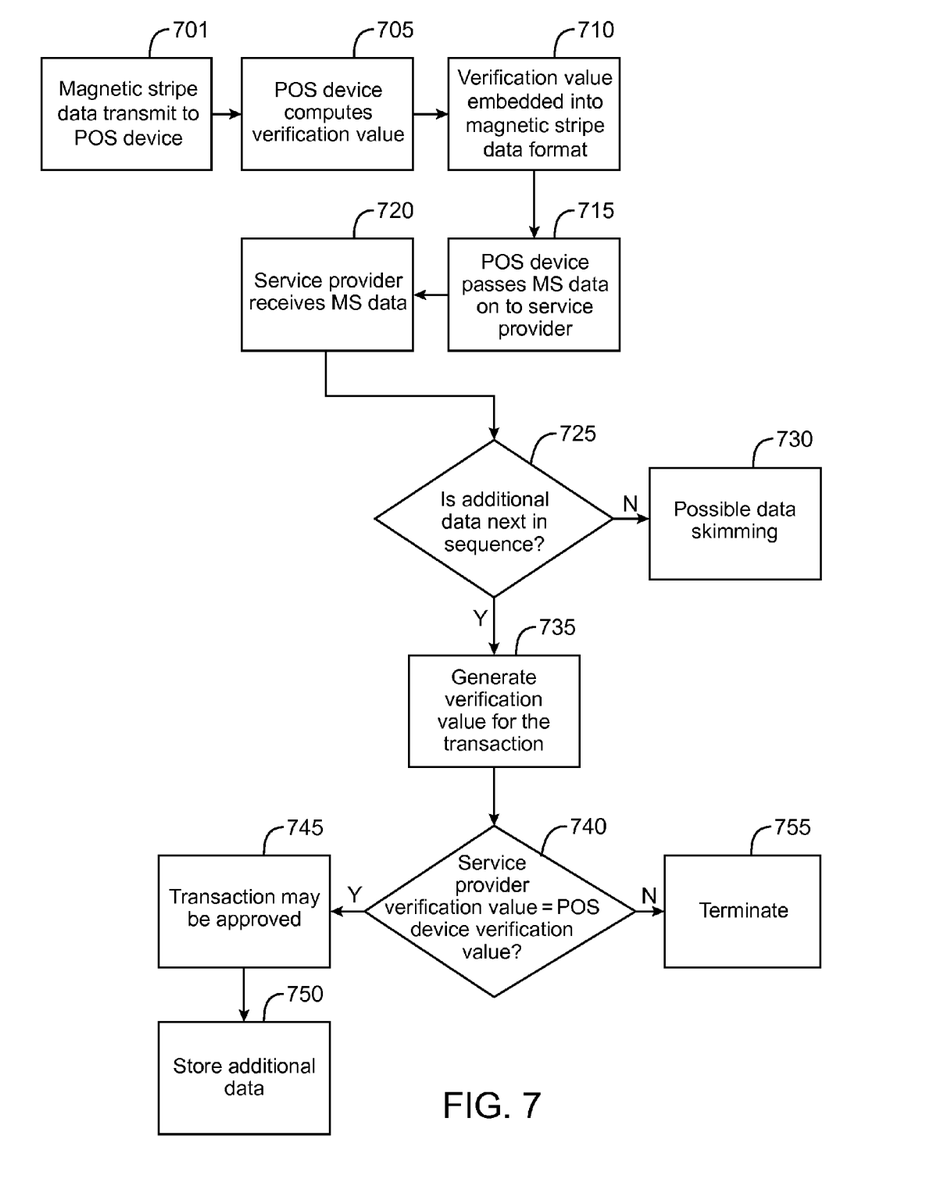
FIG. 7 is a flowchart of an alternate method of utilizing a dynamically created verification value to authenticate a transaction.

In a specific embodiment of FIG. 7, the portable consumer device transmits payment data to a point of sale terminal such as a credit card terminal 701. The point of sale terminal receives the data and computes a verification value for the transaction 705. The verification value may be computed in a number of different ways including, without limitation, using a unique transaction number provided by the point of sale terminal, a timestamp, and/or a transaction amount added to a timestamp. The point of sale terminal may then embed and/or append the verification value and additional data to the payment data 710. The additional data may be required for the service provider computer to verify the transaction. The point of sale terminal then passes the data stream on to the service provider computer 715, likely via a payment network (not shown). The service provider computer receives the payment data with the verification value 720. The service provider computer may optionally compare at least a portion of the additional data embedded or appended by the point of sale terminal to corresponding data stored on the service provider computer to determine if the received data is proper 725. If the received data from the point of sale terminal is improper, the transaction data may potentially have been skimmed 730. If proper data is received, the service provider computer can independently re-generate the verification value for the given transaction utilizing the same process as used by the point of sale terminal 735. If the service provider generated verification value matches the verification value received from the point of sale terminal 740, the service provider deems the payment application to be authentic 745. The service provider computer may then optionally update the additional data which was previously stored on the service provider computer with the additional data received from the portable consumer device for subsequent authentications 750. If the service provider generated verification value does not match the verification value received from the point of sale terminal, the transaction is potentially fraudulent and is terminated 755.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   deploying to a portable consumer device a payment service for a dynamic verification value;
   receiving, at a service provider computer, a payment transaction having the dynamic verification value from the portable consumer device, wherein the dynamic verification value is present in the portable consumer device prior to sending to the service provider computer;
   determining based on an indicator that the deployed payment service supports a dynamic verification value;
   generating, at the service provider computer, the dynamic verification value, the generating based on the indicator that the deployed payment service supports the dynamic verification value; and
   determining if the generated and received dynamic verification values match,
   wherein the service provider computer allows the payment transaction to proceed if the generated and received dynamic verification values match.

2. The method of claim 1 wherein the portable consumer device includes a cellular telephone.

3. The method of claim 1 wherein the portable consumer device includes an integrated circuit card.

4. The method of claim 1 wherein the generated dynamic verification value is generated using a time of day or a randomly generated number.

5. The method of claim 1 wherein the generated dynamic verification value is generated using at least one static data element.

6. The method of claim 5 wherein the at least one static data element includes at least one of an expiration date, a phone number, a SIM card number, a service code, and an account number.

7. The method of claim 1 wherein the generated dynamic verification value is derived using at least one uniquely derived key (UDK).

8. The method of claim 1 wherein the generated dynamic verification value falls within a predetermined range.

9. The method of claim 1 wherein the received dynamic verification value is generated on the portable consumer device.

10. The method of claim 1 wherein the received dynamic verification value is generated on a point of sale terminal.

11. The method of claim 1 wherein the portable consumer device is in the form of a card.

12. The method of claim 1 wherein the operations are performed in the order shown.

13. A non-transitory computer readable medium comprising:
    code for deploying to a portable consumer device a payment service for a dynamic verification value;
    code for receiving, at a service provider computer, a payment transaction having the dynamic verification value from the portable consumer device, wherein the dynamic verification value is present in the portable consumer device prior to sending to the service provider computer;
    code for determining based on an indicator that the deployed payment service supports a dynamic verification value;
    code for generating, at the service provider computer, the dynamic verification value, the generating based on the indicator that the deployed payment service supports the dynamic verification value; and
    code for determining if the generated and received dynamic verification values match, wherein the service provider computer allows the payment transaction to proceed if the generated and received dynamic verification values match.

14. The medium of claim 13 wherein the portable consumer device includes a cellular telephone.

15. The medium of claim 13 wherein the portable consumer device includes an integrated circuit card.

16. The method of claim 13 wherein the generated dynamic verification value is generated using a time of day or a randomly generated number.

17. A computer system executing instructions, the system comprising:

at least one processor;

a memory operatively coupled with the at least one processor, the processor executing computer code stored in the memory for:

deploying to a portable consumer device a payment service for a dynamic verification value;

receiving, at a service provider computer, a payment transaction having the dynamic verification value from the portable consumer device, wherein the dynamic verification value is present in the portable consumer device prior to sending to the service provider computer;

determining based on an indicator that the deployed payment service supports a dynamic verification value;

generating, at the service provider computer, the dynamic verification value, the generating based on the indicator that the deployed payment service supports the dynamic verification value; and         determining if the generated and received dynamic verification values match,         wherein the service provider computer allows the payment transaction to proceed if the generated and received dynamic verification values match.

18. The system of claim 17 wherein the portable consumer device includes a cellular telephone.

19. The system of claim 17 wherein the portable consumer device includes an integrated circuit card.

20. The system of claim 17 wherein the generated dynamic verification value is generated using a time of day or a randomly generated number.

\* \* \* \* \*